United States Patent Office 3,065,104
Patented Nov. 20, 1962

3,065,104
FILM COATING PROCESS
William Paul Kane, Richmond, Va., assignor to E. I. du Pont de Nemours and Company, Wilmington, Del., a corporation of Delaware
No Drawing. Filed Sept. 10, 1959, Ser. No. 839,051
13 Claims. (Cl. 117—76)

This invention relates to flexible, non-fibrous cellulosic wrapping tissue, and more particularly to the production of wrapping tissue comprising a base of regenerated cellulose having thereon a strongly bonded (anchored) moistureproofing coating which adheres to the base film even under conditions of high moisture.

A simplified flow diagram of the method is as follows:

---
Gel regenerated cellulose film
---
|
---
Applying an anchoring agent maintained at a pH of under 4 and consisting of (1) an aluminum or calcium salt of gluconic, acetic or acrylic acid and (2) an anionic thermosetting resin
---
|
---
Drying film to convert resin to thermoset stage
---
|
---
Coating dried film with a moistureproofing coating composition
---

It is now customary practice in the manufacture of regenerated cellulose wrapping tissue to provide the base film with a continuous coating of nitrocellulose and wax composition, polyethylene, vinylidene chloride copolymer, and the like for the purpose of producing a moistureproof, and generally heat-sealable film. These coated sheets are very effective as protective wrappings for bread, cake, candy, cigars, and like commodities. Coated sheets of regenerated cellulose film, however, are unsuitable as primary wrappers for products such as butter, cheese, fresh or frozen fish, ice cream, fresh produce, etc., which have a high moisture or water content, or for packaging in those applications where the package is subjected to conditions of high humidity, unless the coating is especially bonded or anchored to the base film so that it does not slough off, or break away from the base film under conditions of high moisture or humidity.

A principal object of this invention is to provide a coated film of regenerated cellulose wherein the coating is firmly adhered to the substrate by a moisture-resistant bond. Another object is to provide for the anchorage of moistureproof, heat-sealable, continuous coatings to a flexible substrate of regenerated cellulose film to the end that the coated film will be substantially impervious to the destructive influence of moisture and high humidity. A more specific object is to provide for the improved moisture-resistant anchorage of conventional nitrocellulose-wax coatings to regenerated cellulose film. Another specific object is to produce a film of regenerated cellulose having a firmly anchored, continuous coating of vinylidene chloride copolymer. Still another object is to provide for the firm anchorage of continuous polyethylene coating to a base film of regenerated cellulose. These and other objects will more clearly appear from the description which follows:

These objects are realized by the present invention which, briefly stated, comprises in the process of producing coated sheet wrapping material wherein an anchoring agent effective to secure a moistureproofing coating to a base of regenerated cellulose film is applied to a base film of regenerated cellulose, and said base film is thereafter coated with a moistureproofing coating for regenerated cellulose film, the improvement which comprises incorporating in the base film from an aqueous solution maintained at a pH of not over 4, from 0.01 to 0.08% by weight, based on the weight of dry cellulose, of a metal salt from the group consisting of the aluminum salts and the calcium salts of gluconic, acetic and acrylic acids, and from 0.15 to 0.78% by weight of an anionic thermosetting resin from the group consisting of urea-formaldehyde and melamine-formaldehyde anionic resins, and drying the resulting base film at a temperature effective to convert the resin to the thermoset stage.

Aluminum and calcium salts of gluconic, acetic and acrylic acids in addition to contributing to the outstanding effectiveness of the anchoring system of this invention are advantageous in that they are free from any tendency to impart color to the film.

The thermosetting resins suitable for purposes of the present invention are the anionic urea-formaldehyde and the melamine-formaldehyde resins. The most common anionic urea resin now commercially available is sodium bisulfite-modified. By reacting urea, formaldehyde, and sodium bisulfite first under alkaline conditions and then under acid conditions, a water-soluble, viscous resin is obtained. Presumably, the reaction proceeds according to the following equation:

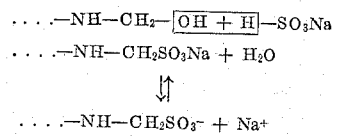

In aqueous solution, the product ionizes and the resin ions bear negative charges. Melamine-formaldehyde-bisulfite resin can be prepared in a similar way but at a higher pH. The amount of bisulfite used is sufficient to react with only a small fraction of the methylol groups, leaving the rest active and capable of further condensation. Sulfur dioxide or sulfurous acid may also be employed. Other modifiers that may be used to make anionic amino resins are: Sodium salt of an amino acid (for urea-formaldehyde or melamine formaldehyde resins) such as amino-carboxylate, e.g., glycinate $$H_2N—CH_2—COONa$$

aliphatic aminosulfonate, e.g., taurine $$H_2N—CH_2CH_2SO_3Na$$

and aromatic aminosulfonate, e.g., sulfonilate $$H_2N—C_6H_4SO_3Na$$

There may also be used the sodium salt of hydroxy acids (for urea-formaldehyde resins) such as hydroxycarboxylate, e.g., lactate; hydroxysulfonate, e.g., isetheionate $$HO—CH_2CH_2SO_3Na$$

formaldehyde sulfoxylate, $HO—CH_2SO_2Na$; and diglycolate. The reaction when using the amino acid salt is illustrated by equation:

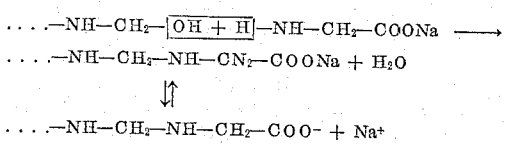

The reaction when using the hydroxy acid salt is illustrated by the equation:

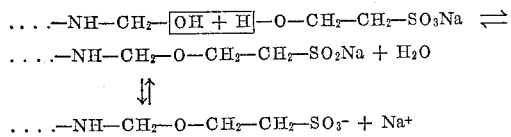

Typical examples of anionic thermosetting resins are also disclosed in Wooding (U.S. Patent 2,688,570, Wooding, U.S. Patent 2,646,368, and in British Patent 595,366.

The pH of the bath from which the anchoring agent is applied to the base film should be maintained at a value not above 4.0, and, for optimum operating conditions, the pH should be maintained between 3.5 and 4.0. If the pH is above 4.0, the rate of pickup and subsequent cure of the system is drastically reduced and it imposes unnecessary operating limitations. Similarly, it is not practical to maintain the pH below 3.5 for economic reasons. The pH is best controlled through the addition of acids, such as gluconic acid, which serve also to promote curing of the resin, i.e., conversion of the resin to the thermoset stage during the drying operation.

The anchoring agent may be incorporated in, or applied to, the regenerated base film by any suitable known method. A particularly convenient method is to include the metal salt and resin in the usual aqueous softener bath, e.g., an aqueous glycerol bath, and impregnate the gel regenerated cellulose film with such bath and thereafter dry the film and cure the resin, all in conventional fashion. Alternatively, the aqueous anchoring agent may be applied to the gel film from an additional tank, or at an intermediate point in the wet end of the conventional dryer by doctor rolls, spraying, etc.

In view of the differential rates of pickup by the gel film of the anchoring agent components and the desired percentages in the final film, it is preferred to have the solution contain 10 to 50%, by weight of solids, of the metal salt component and 50 to 90%, by weight of solids, of the anionic thermosetting resin.

Drying of the treated film to a moisture content below 14%, within a temperature range of 60° to 100° C., which is customary in the manufacture of regenerated cellulose film, also effectively cures the resin incorporated in the film to the final thermoset stage.

The combination of metal salt and anionic thermosetting resin constituting the anchoring agent of this invention has been found to be effective in bonding all types of moistureproofing coatings heretofore employed to moistureproof regenerated cellulose film. These coatings include in addition to the nitrocellulose-wax moisture-resistant lacquer formulations, coatings of rubber hydrochloride, vinylidene chloride copolymers, polyethylene, chlorinated rubber, cellulose acetate and like moisture-resistant film-forming materials capable of forming transparent coatings.

The principles and practice of the present invention are further illustrated in the following specific examples of preferred embodiments:

Example 1

Regenerated cellulose film in the gel state, which had been cast from a viscose solution and purified in the normal manner, was passed through an aqueous softening bath containing 7% glycerol, 0.15% aluminum gluconate (prepared by adding 8 parts, by weight, of aluminum carbonate and 16 parts of 50% gluconic acid to 35.3 parts of water and heating until the solution becomes clear), and 0.45% anionic bisulfite-modified urea-formaldehyde resin ("Uformite" 467). The pH of the bath was maintained between 3.7 and 4.0 by the addition of gluconic acid. Excess bath was removed by squeeges and the film was dried in the usual manner at a temperature of 60–90° C., by bringing the film directly from the path into contact with heated rolls in the dryer. The resultant film containing 0.02% by weight of aluminum gluconate, based on the weight of dry regenerated cellulose film, and 0.45% of resin coated with a coating bath of the following composition:

| | Parts by weight |
|---|---|
| Nitrocellulose (11.4% nitrogen) | 56.2 |
| "Petrex-7–HT" resin (diethylene glycol ester of "Petrex" acid (terpenemaleic acid)), Hercules Powder Co., U.S. 2,236,546 | 11.7 |
| Dibutyl phthalate | 19.9 |
| Dicyclohexyl phthalate | 19.9 |
| Hercules Polypale WB ($H_2SO_4$—modified wood rosin), Hercules Powder Co., U.S. 2,017,866 | 5.8 |
| Crystalline paraffin—60° C. M.P | 3.5 |
| Ethyl acetate | 573.9 |
| Ethyl alcohol | 24.1 |
| Toluene | 285.0 |

The coated film had a peel heat-seal strength at 35% RH (relative humidity) of 300 grams, and of 200 grams at 81% RH and an anchorage rating of A–1.

A coated control film prepared as above except that 0.5% of "Uformite" 467 resin was used in place of the combination of metal salt and resin showed a peel heat-seal strength of 85 grams at 35% RH, and 35 grams at 81% RH, and an anchorage rating of S.

Peel heat-seal strength is a measure of the strength of the bond between two films when they are sealed together by heat and pressure. A piece of the coated film 4″ x 10″ with the grain running in the long direction is cut into two pieces 4″ x 5″. The two pieces are superimposed so that opposite surfaces are in contact. The two pieces of superimposed film are then sealed together at each end at right angles to the grain. A ¾″ wide sealing bar heated to a temperature of 130° C. contacts the ends for 2 seconds at a pressure of 20 p.s.i. The sealed sheets are then cut in half at right angles to the grain. From the center of the four resulting pieces 1½″ wide strips parallel to the grain are cut. The four sets of strips are then conditioned for 48 hours at 34° C. and 81% relative humidity. They are tested by opening each set of strips at the free ends, placing them in a Suter testing machine and pulling them apart. The force in grams required to separate the seal after it has been ruptured is the peel heat-seal strength.

Anchorage rating refers to the adhesion of the coating to the base film when in direct contact with water. Samples of the coated film are suspended in water at 25° C. for 60 hours and then graded approximately as follows:

A–1—no blisters
A–2—few blisters
A–3—decided blistering
S—coating sloughs off at blistered or unblistered portions.

Example 2

Example 1 was repeated except that the base film contained 0.05% aluminum acetate and 0.6% anionic resin. The coated film had a peel heat-seat strength of 350 grams at 35% RH, and 240 grams at 81% RH. The anchorage rating was A–1.

Example 3

Example 1 was repeated except that the base film contained 0.06% of calcium acrylate and 0.56% of anionic resin. The coated film had a peel heat-seal strength of 340 grams at 35% RH, and 200 grams at 81% RH. Again the anchorage rating was A–1.

Example 4

Regenerated cellulose film containing 0.03% aluminum gluconate and 0.48 "Uformite" 467 anionic resin was prepared in accordance with the procedure of Example 1. The treated film was then coated with a 7% xylene solution of polyethylene and thereafter dried in air at 160°

C. The coated film exhibited peel heat-seal strengths of 540 grams at 35% RH and 180 grams at 81% RH and an anchorage rating of A-1.

A control film identical except for the omission of the metal salt, had peel heat-seal strengths of 275 grams at 35% RH and 110 grams at 81% RH, and an anchorage rating of A-3.

*Example 5*

Example 4 was repeated except that the base film contained 0.02% aluminum acetate and 0.3% anionic resin. The peel heat-seal strength of the coating was 450 grams at 35% RH, and 275 grams at 81% RH. The anchorage rating was A-1.

*Example 6*

Example 4 was repeated except that the base film contained 0.04% calcium acrylate and 0.54% anionic resins. The peel heat-seal strength of the coating was 400 grams at 35% RH, and 300 grams at 81% RH. The anchorage rating was A-1.

*Example 7*

Following the procedure of Examples 1 a film of regenerated cellulose was prepared containing 0.04% aluminum acetate and 0.68% of "Uformite" 467 anionic resin. The resulting film was coated with a melt of polyethylene and cooled. The coated film showed peel heat-seal strengths of 500 grams and 400 grams at 35% RH and 81% RH respectively, and an anchorage rating of A-1.

A control film containing 0.58% of the anionic resin and no metal salt exhibited a peel heat-seal strength of 190 grams at 35% RH, and 85 grams at 81% RH. The anchorage rating was A-3.

*Example 8*

Example 7 was repeated except that the base film contained 0.06% aluminum gluconate and 0.52% anionic resin. Peel heat-seal strengths were 425 grams at 35% RH and 360 grams at 81% RH, and the anchorage rating was A-1.

*Example 9*

Example 7 was repeated except that the base film contained 0.03% calcium acrylate and 0.42% anionic resin. The peel heat-seal strength at 35% RH was 550 grams and at 81% RH, 450 grams. The anchorage rating was A-1.

*Example 10*

Following the procedure of Example 1 a regenerated cellulose base film containing 0.05% aluminum gluconate and 0.48% "Uformite" 467 anionic resin. This film was coated with a coating consisting of:

20% solids as follows—

| | Percent |
|---|---|
| 90:10 vinylidene chloride-acrylonitrile copolymer | 98.75 |
| Carnauba wax | 0.5 |
| Stearic acid | 0.5 |
| Finely divided calcium carbonate | 0.25 |

80% solvent as follows—

| | |
|---|---|
| Toluene | 50 |
| Methyl ethyl ketone | 50 | to a thickness of 4 grams of solids per square meter of film and dried at 130° C. for 100 seconds.

The peel heat-seal strength of the coated film measured 200 grams at 35% RH and 45 grams at 81% RH. The anchorage rating was A-3.

A control film containing no metal salt and 0.53% of the anionic resin had a peel heat-seal strength of 80 grams at 35% RH, 60 grams at 81% RH, and an anchorage rating of S.

*Example 11*

Following the procedure of Example 1 a film of regenerated cellulose was prepared containing 0.05% calcium acrylate and 0.58% "Uformite" 467 anionic resin. This film was coated with an aqueous copolymer dispersion prepared by reacting a charge consisting of:

| | Parts by weight |
|---|---|
| Water | 400 |
| Vinylidene chloride | 380 |
| Methyl acrylate | 20 |
| Itaconic acid | 8 |
| Duponol ME (sodium lauryl sulfate) | 8 |
| Ammonium persulfate | 2 |
| Meta-sodium bisulfite | 1 | at atmospheric pressure and a temperature of 33°–34° C., for two hours. After drying the coated film exhibited a peel heat-seal strength of 300 grams at 35% RH and 250 grams at 81% RH, and an anchorage rating of A-1.

A control film employing only the anionic resin (0.68%) as the anchoring agent exhibited peel heat-seal strengths of 175 grams at 35% RH and 120 grams at 81% RH, and an anchorage rating of A-3.

From the foregoing description and examples it is apparent that the primary advantage of this invention resides in providing an additional anchorage system for regenerated cellulose film of significant application in packaging under highly humid conditions. Moreover, this anchorage system affords markedly superior bath stability over cationic urea and melamine formaldehyde anchorage resins as far as precipitation by sulfate and chloride ions is concerned.

I claim:

1. In the process of producing coated sheet wrapping material wherein an anchoring agent effective to secure a moistureproofing coating to a base of regenerated cellulose film is applied to a base of regenerated cellulose film and said base is thereafter coated with a moistureproofing coating composition for regenerated cellulose film, the improvement which comprises incorporating in the base film from an aqueous solution maintained at a pH of not over 4, an anchoring agent consisting essentially of (1) from 0.01 to 0.08% by weight, based on the weight of dry cellulose, of a metal salt from the group consisting of the aluminum salts and the calcium salts of gluconic, and acrylic acids, and (2) from 0.15 to 0.78% by weight of an anionic thermosetting resin from the group consisting of urea-formaldehyde and melamine-formaldehyde anionic resins, and drying the resulting base film at a temperature effective to convert the resin to the thermoset stage.

2. The process of claim 1 wherein the metal salt is aluminum gluconate.

3. The process of claim 1 wherein the metal salt is calcium acrylate.

4. The process which comprises applying to gel regenerated cellulose film from aqueous solution maintained at a pH of not over 4 an anchoring agent consisting essentially of (1) from 0.01 to 0.08% by weight, based on the weight of dry cellulose, of a metal salt from the group consisting of the aluminum salts and the calcium salts of gluconic, and arcylic acids, and (2) from 0.15 to 0.78% by weight of an anionic thermosetting resin from the group consisting of urea-formaldehyde and melamine-formaldehyde anionic resins, drying the resulting film at a temperature effective to convert the resin to the thermoset stage, and thereafter coating the dried film with a moistureproofing coating composition for regenerated cellulose film.

5. The process which comprises applying to gel regenerated cellulose film from aqueous solution maintained at a pH of not over 4 an anchoring agent consisting essentially of (1) from 0.01 to 0.08% by weight, based on the weight of dry cellulose, of a metal salt from the group consisting of the aluminum salts and the calcium salts of gluconic, and acrylic acids, and (2) from 0.15 to 0.78% by weight of an anionic thermosetting resin from the group consisting of urea-formaldehyde and melamine-formaldehyde anionic resins, drying the resulting film at a temperature effective to convert the resin to the thermoset stage, and thereafter coating the dried film with a nitrocellulose and wax moistureproofing coating composition.

6. The process of claim 5 wherein the metal salt is aluminum gluconate.

7. The process of claim 5 wherein the metal salt is calcium acrylate.

8. The process which comprises applying to gel regenerated cellulose film from aqueous solution maintained at a pH of not over 4 an anchoring agent consisting essentially of (1) from 0.01 to 0.08% by weight, based on the weight of dry cellulose, of a metal salt from the group consisting of the aluminum salts and the calcium salts of gluconic and acrylic acids, and (2) from 0.15 to 0.78% by weight of an anionic thermosetting resin from the group consisting of urea-formaldehyde and melamine-formaldehyde anionic resins, drying the resulting film at a temperature effective to convert the resin to the thermoset stage, and thereafter coating the dried film with a vinylidene chloride copolymer moisture-proofing coating composition.

9. The process of claim 8 wherein the metal salt is aluminum gluconate.

10. The process of claim 8 wherein the metal salt is calcium acrylate.

11. The process which comprises applying to gel regenerated cellulose film from aqueous solution maintained at a pH of not over 4 an anchoring agent consisting essentially of (1) from 0.01 to 0.08% by weight, based on the weight of dry cellulose, of a metal salt from the group consisting of the aluminum salts and the calcium salts of gluconic, and acrylic acids, and (2) from 0.15 to 0.78% by weight of an anionic thermosetting resin from the group consisting of urea-formaldehyde and melamine-formaldehyde anionic resins, drying the resulting film at a temperature effective to convert the resin to the thermoset stage, and thereafter coating the dried film with a polyethylene moistureproofing coating composition.

12. The process of claim 11 wherein the metal salt is aluminum gluconate.

13. The process of claim 11 wherein the metal salt is calcium acrylate.

References Cited in the file of this patent

UNITED STATES PATENTS

| | | |
|---|---|---|
| 2,688,570 | Wooding | Sept. 7, 1954 |
| 2,721,150 | Grantham | Oct. 18, 1955 |
| 2,726,171 | Morf | Dec. 6, 1955 |
| 2,955,958 | Brown | Oct. 11, 1960 |